June 28, 1966  F. J. HENKEL  3,257,909
ROTARY MACHINING APPLIANCE WITH SELECTIVE FEEDING ARRANGEMENT
Filed Feb. 5, 1964  2 Sheets-Sheet 1

INVENTOR.
FERDINAND J. HENKEL
BY
Barthel + Bugbee
ATTORNEYS

June 28, 1966   F. J. HENKEL   3,257,909
ROTARY MACHINING APPLIANCE WITH SELECTIVE FEEDING ARRANGEMENT
Filed Feb. 5, 1964   2 Sheets-Sheet 2
FIG. 4
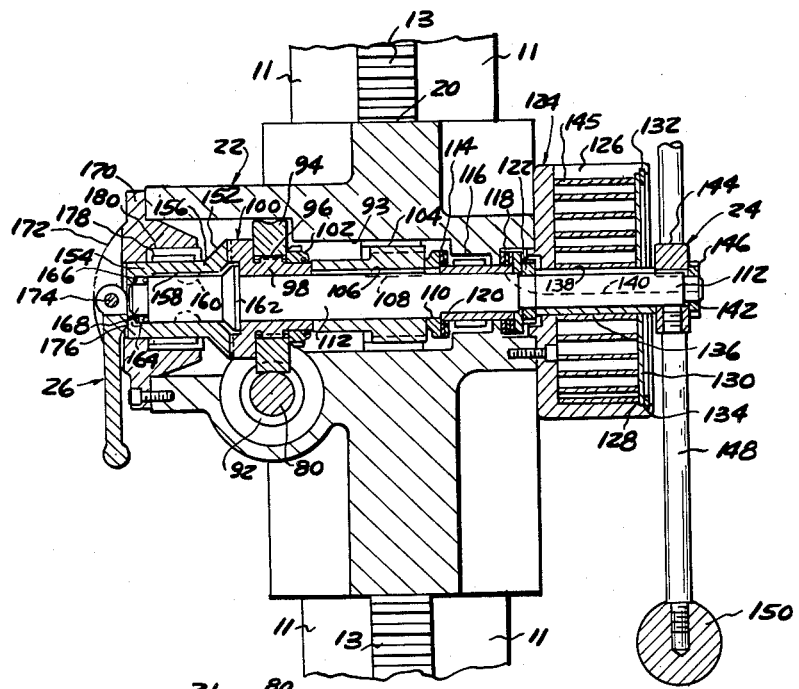
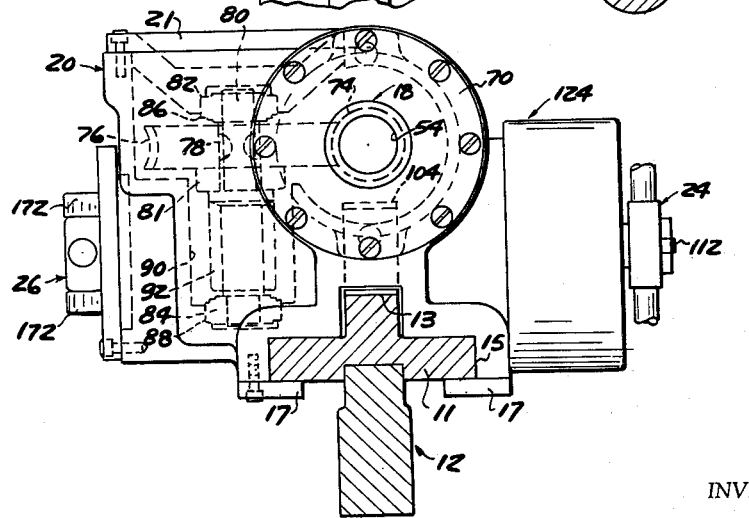
FIG. 3
INVENTOR.
FERDINAND J. HENKEL
BY
Barthel & Bugbee
ATTORNEYS United States Patent Office 3,257,909
Patented June 28, 1966

3,257,909
ROTARY MACHINING APPLIANCE WITH
SELECTIVE FEEDING ARRANGEMENT
Ferdinand J. Henkel, Birmingham, Mich., assignor to Lamina, Inc., Oak Park, Mich., a corporation of Michigan
Filed Feb. 5, 1964, Ser. No. 342,623
4 Claims. (Cl. 90—16)

This invention relates to machine tools and, in particular, to rotary machining appliances.

One object of this invention is to provide a compact hydraulic motor-driven rotary machining appliance having a feeding arrangement which is selectively operable either manually by the operator or automatically by the same rotary hydraulic motor which rotates the tool spindle with means under the control of the operator for shifting from manual feed to automatic feed and vice versa.

Another object is to provide a compact hydraulic motor-driven machining appliance of the foregoing character wherein the mechanism of the feeding arrangement is so constructed and positioned as to be contained in an unusually compact space and consequently capable of being mounted within a very small housing on a vertically-movable carriage which also carries the hydraulic motor.

Another object is to provide a compact hydraulic motor-driven drilling appliance of the foregoing character wherein the feeding arrangement, hydraulic motor and drill holder are all self-contained within the housing on the vertically-movable carriage which is raised or lowered by rack and pinion mechanism with the pinion on the carriage rotated by the feeding arrangement, and wherein the rack is supported by the frame upright or standard of the drilling appliance.

Other objects and advantages of the invention will become apparent during the course of the following description of the accompanying drawings, wherein:

FIGURE 3 is a bottom plan view of the machining appliance shown in FIGURES 1 and 2; and FIGURE 4 is a vertical section taken along the line 4—4 in FIGURE 2.

Figure 1:
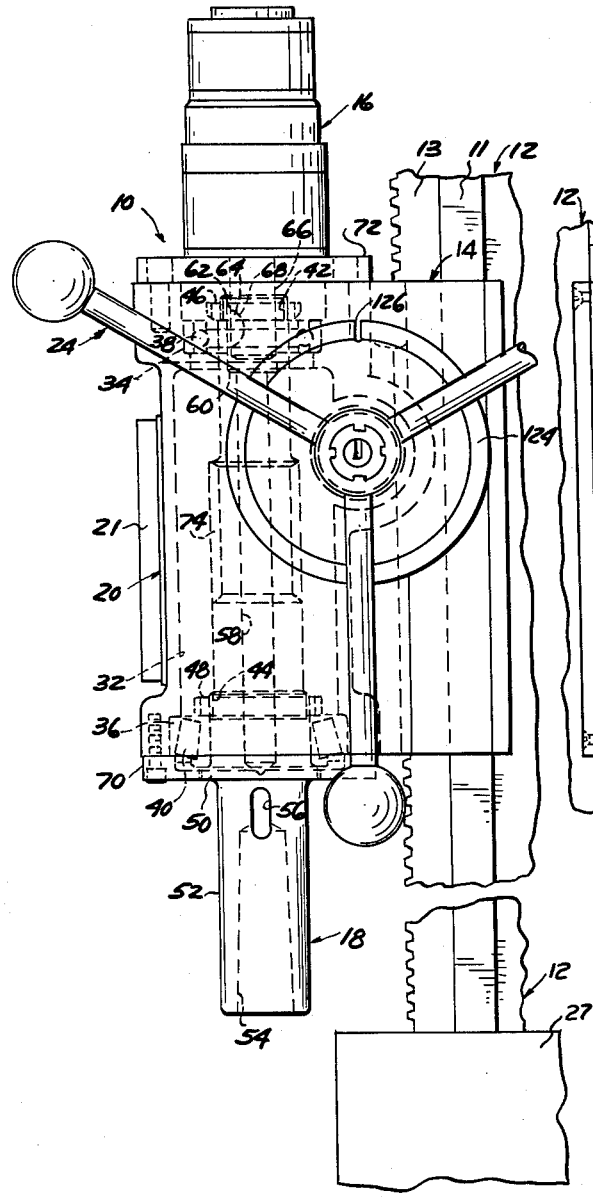
FIGURE 1 is a right-hand side elevation of a compact hydraulic motor-driven machining appliance according to one form of the invention, with the end portion of one of the hand levers omitted to conserve space.
Figure 2:
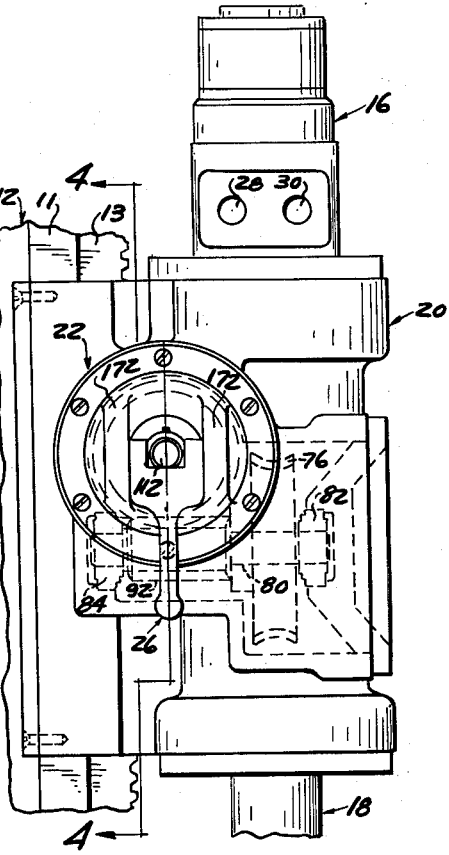
FIGURE 2 is a left-hand side elevation of the machining appliance shown in FIGURE 1.

Referring to the drawings in detail, FIGURES 1 to 3 inclusive show a compact rotary machining appliance, generally designated 10, as consisting generally of an upright guiding and supporting structure 12 including a vertical guide bar 11 and toothed rack bar 13 bolted or otherwise secured thereto in T-shaped cross-section, and a carriage 14 movable upward and downward relatively to the structure 12 and having a vertical slot 15 of T-shaped cross-section receiving the bars 11 and 13 and retaining them by wear bars 17 bolted to the carriage 14. A hydraulic rotary motor 16 is mounted on top of the carriage 12, and a rotary vertical machining tool spindle 18 is journaled in a housing 20 on the carriage 14 and drivingly connected to the hydraulic motor 16. A cover plate 21 is bolted to the open front of the housing 20 and a feeding arrangement 22 is contained within the housing 20 and is selectively operable either manually by a hand wheel 24 or automatically by a cam handle or clutch shifting member 26 on opposite sides of the carriage 14. The housing 20 forms the major portion of the carriage 14 and is in the form of a hollow casting. The guiding and supporting structure 12 includes a hollow base 27 containing a holddown electromagnet (not shown). The rotary hydraulic motor 16 is of the type described and illustrated in my co-pending application Serial No. 327,656, filed December 3, 1963, for Portable Rotary Machining Appliance and Apparatus, hence its details are beyond the scope of the present invention. It is believed sufficient to state here that the rotary hydraulic motor 16 is supplied with hydraulic pressure fluid through flexible conduits (not shown) connected to threaded service ports 28 and 30 (FIGURE 2), either serving as intake port while the other serves as exhaust port, depending upon the direction of flow of the liquid and whether the pressure fluid is supplied to and exhausted from the ports 28 and 30 by a hydraulic circuit, also shown and described in my above-mentioned co-pending application Serial No. 227,656, the fluid flow being reversed as to direction by a conventional four-way valve (not shown).

The housing 20 contains a vertical chamber 32 (FIGURE 1) having counterbores 34 and 36 at its upper and lower ends. The upper counterbore 34 contains an anti-friction ball bearing unit 38, whereas the lower counterbore 36 contains an anti-friction tapered roller bearing unit 40, the bearing units 38 and 40 rotatably supporting the tool spindle 18 near its upper and lower ends. The drilling spindle 18 immediately above the anti-friction bearing units 38 and 40 is provided with threaded portions 42 and 44 respectively upon which are threaded upper and lower nuts 46 and 48 respectively which retain the spindle 18 in assembly, aided by an annular flange 50 immediately below the tapered roller bearing unit 40.

The tool spindle 18 near its lower end is provided with a tool holder or chuck 51 (FIGURE 1) containing a tapered bore 54 adapted to receive the correspondingly-tapered shank of a twist drill, reamer, end mill or other rotary machining tool (not shown), the upper end of which projects into a vertically-elongated transverse knockout slot 56 through which is inserted the usual knockout wedge for removing the rotary tool from the tool holder 52. The tool spindle 18 throughout the upper portion of its length is provided with a bore 58 which at its upper end terminates in a counterbore or socket 60 containing an internal groove or keyway 62 in which is seated the outer end of a conventional Woodruff key 64. Projecting downwardly from the hydraulic motor 16 into the socket or counterbore 60 is the lower end of the rotary hydraulic motor shaft 66 provided with an arcuate recess or key seat 68 which receives the Woodruff key 64 and drivingly connects the hydraulic motor shaft 66 to the tool spindle 18. An annular cover plate or retaining plate 70 bolted to the lower end of the housing 20 closes the lower end of the chamber 32, extends around the tool spindle flange 50 in spaced relationship therewith, and holds the tapered roller bearing unit 40 in its counterbore 36. The upper end of the chamber 32, namely the upper counterbore 34 is closed by the circular base plate or annular flange 72 connected to the lower end of the hydraulic motor 16 and bolted to the upper end of the housing 20, thereby also securing the motor 16 to the housing 20 and carriage 14.

Intermediate the threaded portions 42 and 44, the tool spindle 18 is provided with an initial or primary right-hand worm 74 (FIGURES 1 and 3) preferably integral therewith. The worm 74 meshes with an initial or primary worm wheel 76 (FIGURE 3) keyed as at 78 to a primary feeding input shaft 80 against a flange 81 thereof and journaled in spaced anti-friction bearing units 82 and 84, preferably roller bearings, mounted in counterbores 86 and 88 at opposite ends of a horizontal chamber 90 in the housing 20 communicating with the vertical chamber 32. The primary shaft 80 intermediate its ends is provided with a secondary right-hand worm 92 (FIGURES 3 and 4) preferably integral therewith. Meshing with the worm 92 in an extension horizontal chamber 93 of the chamber 90 is a secondary worm wheel 94 which is splined as at 96 to a fixed tubular jaw clutch member 98 (FIGURE 4) and held against the crown-toothed enlargement or clutch head 100 thereof by a nut 102 threaded upon the hub of the fixed clutch member 98. The latter in turn is held in place by the tubular hub of a feeding pinion 104 which is drivingly secured by a square key 106 seated in a keyway 108 in the enlarged intermediate portion 110 of a feeding output shaft 112.

Also mounted on the shaft 112 adjacent the pinion 104 is an anti-friction thrust bearing 114 and an anti-friction radial bearing 116, while beyond the latter is a second anti-friction thrust bearing 118, the bearings 114, 116 and 118 encircling a sleeve 120 mounted on the shaft 112 and held in position by a nut 122 threaded on the shaft 112. Bolted to one end of the housing 20 adjacent the nut 122 is a cup-shaped spring casing 124 having a spring anchorage slot 126 at the top thereof and having a counterbore 128 (FIGURE 4) receiving a closure disc or plate 130 held in place by a snap ring 132 in an internal groove 134 in the spring casing 124. The outer end of the shaft 112 adjacent the casing 124 carries a spacing sleeve 136 with a peripheral slot 138 aligned with a longitudinal spring anchorage groove 140 extending inward from the reduced diameter threaded end portion 142 adjacent the hub 144 of the hand wheel 24. Mounted within the casing 124 is a spiral counterbalancing spring 145 with its opposite ends anchored in the slot 138 and groove 140 respectively. The threaded portion 142 carries a retaining nut 146 which holds the hub 144 of the hand wheel 24 onto the end of the shaft 112. The 144 is drilled and threaded at circumferentially-spaced locations to receive hand levers or handle rods or spoke 148 upon the outer threaded ends of which are threaded handle knobs 150.

Interlocking with the face teeth of the crown-toothed enlargement or head 100 of the fixed tubular clutch member 98 are the face-teeth on the head 152 of a tubular movable jaw clutch member 154. The movable jaw clutch member 154 is internally-grooved to provide a keyway 156 receiving a Woodruff key 158 which drivingly connects the movable jaw clutch member 154 to the shaft 112 containing the key seat 160 in which the key 158 is seated. The shaft 112 is provided with an annular enlargement or flange 162 lying between the toothed enlargements 100 and 152 of the fixed and movable jaw clutch members 98 and 154 respectively. The outer end of the movable jaw clutch member 154 is provided with an internal annular shoulder 164 which serves as a spring abutment for a compression spring 166 which encircles a reduced diameter end portion 168 of the shaft 12 and normally urges the movable jaw clutch member 154 out of clutching engagement with the fixed jaw clutch member 98.

The outer end of the horizontal chamber extension 93 is closed by a closure head 170 which is bolted to the housing 20 and is provided with a pair of spaced parallel bosses 172 (FIGURE 2) projecting axially therefrom. The bosses 172 are drilled transversely to receive the opposite ends of a pivot pin 174 upon which the cam handle 26 is pivotally mounted. The cam handle 26 has a contact portion 176 (FIGURE 4) spaced away from its pivot pin 174 and engageable with the outer end of the movable clutch member 154. As a consequence, when the cam handle 26 is pushed or swung inward or to the right in FIGURE 4, it pushes the movable jaw clutch member 154 axially inward into intermeshing engagement with the toothed enlargement 100 on the fixed jaw clutch member 98. An anti-friction bearing 178, preferably a needle bearing, is seated in a counterbore 180 in the closure head 170 so as to rotatably support the sliding or movable clutch member 154 and consequently rotatably support the left-hand end of the shaft 112 and thereby cooperate with the needle bearing 116 which supports the opposite end of the shaft 112.

In the operation of the invention, let it be assumed that the working parts of the rotary machining appliance 10 are in the relative positions shown in FIGURE 4 of the drawings and that pressure fluid is supplied to the intake port 28 and exhausted from the exhaust port 30 from the hydraulic circuit (not shown), causing the motor 16 to rotate the tool spindle 18 to which it is directly connected by the Woodruff key 64 (FIGURE 1). Since the cam handle 26 is in its lower position, with the contact portion 176 engaging and pushing the end of the jaw clutch member 154 inward to the right (FIGURE 4), the teeth on the enlargement or head 152 thereof engaging and intermeshing with the teeth on the enlargement or head 100 of the fixed jaw clutch member 98, impart rotation to the pinion 104 engaging the toothed rack bar 13, thus moving the carriage 14 upward or downward along the vertical guide bar 11 of the guiding and supporting structure 12 in a direction depending upon whether pressure fluid is supplied to the port 28 or to the port 30 of the hydraulic motor 16, as determined by the position of the conventional four-way valve (not shown) in the hydraulic fluid pressure supply circuit (not shown). This rotation of the pinion 104 (FIGURE 4) arises from the rotation of the primary worm 74 (FIGURE 1) on the tool spindle 18 rotating the primary worm wheel 76 on the primary shaft 80, whence the rotation of the secondary worm 92 causes rotation of the secondary worm wheel 94 and the fixed tubular jaw clutch member 98 to which it is splined at 96. The rotation of the fixed jaw clutch member 98 causes rotation of the movable jaw clutch member 154 temporarily in mesh therewith and the latter in turn causes rotation of the feed shaft 112 and pinion 104 keyed thereto.

If, on the other hand, the operator wishes to employ a manual feed, he swings the cam handle 26 (FIGURE 4) upward in a clockwise direction, so as to disengage the contact portion 176 from the outer end of the jaw clutch member 154, whereupon the compression spring 166 inside the movable jaw clutch member 154 moves the latter outward to the left so as to disengage its teeth from the teeth on the fixed jaw clutch member 98 and interrupt the power feed of the feed shaft 112 and pinion 104. The operator then grasps one of the knobs 150 upon the hand wheel 24 and swings the hand lever 148 thereof downward to rotate the pinion 104 manually and thus cause the carriage 14 to move downward under manual feed and thus feed the rotary machining tool in the socket 54 of the main spindle 18 into the work. Swinging the hand wheel 24 in the opposite direction retracts the rotary machining tool, such as a drill, from the work.

Thus, in this manner, this invention has provided a selective feeding arrangement of a strong and powerful yet compact character which is self-contained within its housing and which is instantly shifted from manual feed to automatic feed and vice versa as described by the operator.

What I claim is:

1. A compact rotary machining appliance with a selective manual and power feeding arrangement, said appliance comprising a supporting structure having an elongated guideway and an elongated toothed rack thereon, a carriage mounted for travel along said structure and having a guided portion engaging said guideway, and a compact power-driving and selective manual and power feeding arrangement self-contained within said carriage and movable unitarily therewith; said arrangement including a feeding output shaft journaled in said carriage adjacent said guide portion, a feeding pinion drivingly connected to said output shaft and meshing with said rack, a rotary machining tool spindle journaled in said carriage with its axis disposed substantially perpendicular to the axis of said feeding output shaft and having a tool holder thereon, a rotary hydraulic motor mounted on said carriage adjacent said rotary tool spindle and drivingly connected thereto, a manual feeding member operatively connected to said feeding output shaft for manual rotation thereof, a fixed clutch member drivingly connected to said feeding output shaft, a movable clutch member movably mounted in said carriage for motion into and out of clutching engagement with said fixed clutch member, power-transmitting mechanism drivingly connecting said machining tool spindle with said movable clutch member, and manually-controlled means for shifting said movable clutch member into and out of clutching engagement with said fixed clutch member.

2. A compact rotary machining appliance, according to claim 1, wherein said power-transmitting mechanism includes an initial worm mounted on said tool spindle, a final worm wheel mounted on said feeding output shaft, and gearing connecting said initial worm and said final worm wheel.

3. A compact rotary machining appliance, according to claim 2, wherein said gearing includes a rotary feeding input shaft journaled in said carriage, an intial worm wheel drivingly connected to said input shaft and meshing with said initial worm, and a final worm drivingly connected to said input shaft and meshing with said final worm wheel.

4. A compact rotary machining appliance, according to claim 1, wherein said rotary hydraulic motor is mounted on said carriage above said rotary tool spindle and has a rotary power shaft operatively connected to said rotary machining spindle.

References Cited by the Examiner
UNITED STATES PATENTS

| | | | |
|---|---|---|---|
| 1,576,110 | 3/1926 | Galloway et al. | 77—33.1 |
| 2,339,604 | 1/1944 | Linden et al. | 77—34.2 |
| 3,068,723 | 12/1962 | Pettigrew et al. | 77—33.1 |
| 3,089,357 | 5/1963 | Grau | 77—33.9 |
| 3,118,325 | 1/1964 | Pettigrew | 77—34.2 |

WILLIAM W. DYER, JR., *Primary Examiner.*

G. A. DOST, *Assistant Examiner.*